Jan. 11, 1966     F. C. HEBERT     3,228,267
COMBINATION CENTERING AND FACING TOOL
Filed Nov. 13, 1962
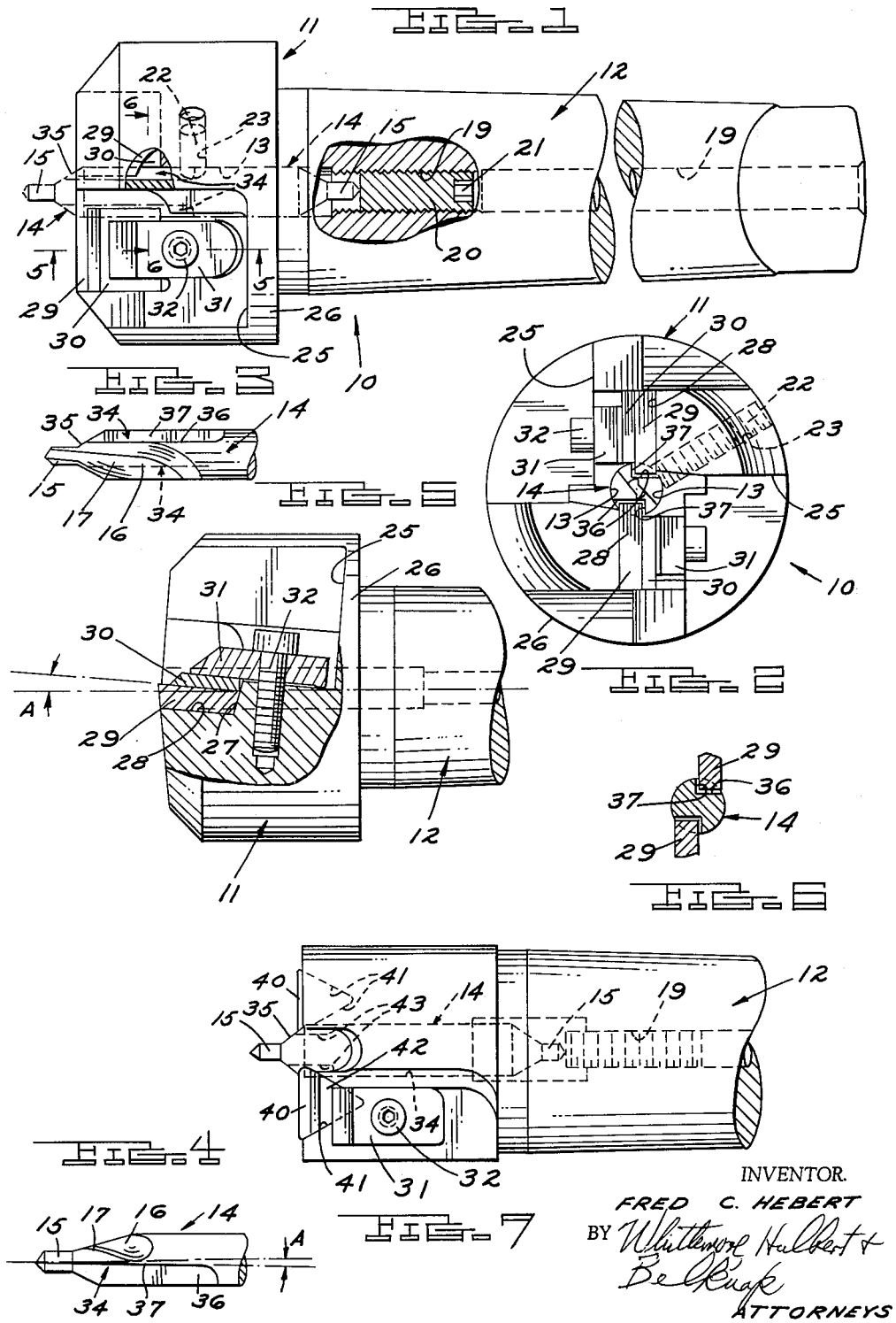
INVENTOR.
FRED C. HEBERT
BY
ATTORNEYS

United States Patent Office  3,228,267
Patented Jan. 11, 1966

3,228,267
COMBINATION CENTERING AND
FACING TOOL
Fred C. Hebert, 400 N. Main St., Romeo, Mich.
Filed Nov. 13, 1962, Ser. No. 236,864
2 Claims. (Cl. 77—65)

The present invention relates to a combination tool for simultaneously drilling a center hole in an end face of a workpiece and performing a rotary facing operation on that surface, the inner circumference of the facing cut coinciding with the outer periphery of the center aperture.

It is an object of the invention to provide a combination centering and facing tool of this character, featured by an axially extending, fluted center drill having a coaxially telescoped mount upon a facing cutter holder, in which the drill in question is provided with an elongated slot or like side formation radially receiving a side edge of a facing cutter or cutters supported by the holder in a radially overlapped relation of the drill and cutter. Further provision is made for axially but non-rotatively adjusting the drill relative to the cutter so as to bring the fluted conical cutting edge of the former into intersection at an acute angle with the cutting plane generated by the forward cutting edge of the facing cutter component. Thus, the invention makes possible in a ready and speedy fashion a selection or variation of the outer diameter of the conical drilled center opening, as determined by the inner periphery of the facing cut where the two machined surfaces intersect.

A further object is to provide a combined tool as described, in which the cutters referred to above, in reference to which the center drill has a radially overlapped and axially movable relation, are throwaway type carbide tips or inserts of a known type, held in position in which they overlap axial side slots of the centering drill by means of known chipbreaker and clamp components, the latter fixedly clamped to the body of the tool holder. These inserts are of equilateral polygonal outline, shown in the two illustrated embodiments of the invention as being rectangular and triangular, respectively.

Yet another object is to provide a tool as described in which the fluted drill, modified by side slots receiving radially inner edges of the cutting insert, is disposed in a forwardly opening axial counterbore of the tool holder; and in which such drill as thus mounted is axially engaged from the rear by adjusting means threaded into a coaxial rear bore of the tool holder. Such threaded adjusting means may be rotatively operated to advance the drill by means of a suitable operator, such as an Allen set screw wrench inserted in said bore, thus enabling the axial forward adjustment, or permitting rearward retraction, of the drilling cutter to an extent desired.

In further accordance with the invention, it is contemplated that the facing cutter tips or inserts may be mounted to the body, being held in place thereon by chipbreaker and clamp means, for either a positive rake or negative rake cut, the slotting of the drill being then correspondingly angled to permit its axial movement in one direction or the other relative to the rake-mounted cutting insert without interference with the latter.

The foregoing as well as other objects will become more apparent as this description proceeds, especially when considered in connection with the accompanying drawing illustrating the invention, wherein:

FIG. 1 is a fragmentary side elevational view, partially broken away and in axial section, showing the improved tool and the relationship of its fluted and slotted drill component to facing cutters of the tool;

FIG. 2 is a view in forward end elevation of the tool;

FIGS. 3 and 4 are fragmentary side elevational views of the centering drill component, from 90° opposed directions;

FIG. 5 is a fragmentary side elevational view, partially broken away and in vertical section along a line corresponding to line 5—5 of FIG. 1, showing facing cutter, chipbreaker and clamp components of the tool, with the center drill component removed;

FIG. 6 is a fragmentary view in section on a line corresponding to line 6—6 of FIG. 1; and FIG. 7 is an end elevational view similar to FIG. 1, showing a modified adaptation of the tool featuring triangular throw-away facing cutter inserts, rather than the rectangular type shown in the embodiment of FIGS. 1 through 6.

The tool of the invention, generally designated by the reference numeral 10, comprises a tool holder characterized by a forward cylindrical cutter mounting body 11 and a rearwardly extending tapered shank 12. The body 11 is provided with a forward axial counterbore 13 for the fairly snug reception of a special centering drill 14, permitting forward and rearward axial movement of drill 14, once the latter is unclamped. Drill 14 is shown as being a double-ended one having like end pilot tips 15 from which the usual flutes 16 (FIGS. 3 and 4) extend axially inwardly to define in a known way the cutting edges 17 of the drill. In these respects only is the drill 14 conventional.

The rear drill tip 15 extends into a threaded bore 19 of the tool shank 12; and an adjusting plug 20 is threadedly engaged with the shank in this zone, being engageable at its forward end with the drill to advance the latter (once unclamped) in the counterbore 13 upon right-hand rotation of adjusting plug 20, o rto permit rectractile movement of the drill upon reverse rotation of the plug.

For this purpose, the plug 20 has an Allen set screw recess 21 at its rear end, which is accessible by a suitable wrench from the rear of the tool in a manner clearly indicated in FIG. 1. When adjusted to its proper position, drill 14 is fixedly held in place in a known manner, as by means of a set screw 22 threaded into a radial bore 23 of the tool holder head 11, as shown in FIGS. 1 and 2.

The forward end of the tool holder head 11 is provided with a pair of diametrically opposed, radially and axially extending recesses 25 terminating short of the fully cylindrical rear end 26 of the head. These recesses radially inwardly intersect the tool head bore 13 within which the drill 14 is telescoped; and each recess 25 is still further relieved downwardly to provide a facing cutter insert and chipbreaker receiving pocket defined by an inner or rear wall 27 and a flat seating surface 28. A standard type of rectangular throw-away cutting insert or bit 29 is disposed upon the seat, rearwardly abutting the surface 27; and the surface 28 is shown at an angle to the horizontal axis of the tool shank 12, so that the upper surface of the insert will be disposed at an appropriate positive rake angle A (FIG. 5). The rear abutting surface 27 is shown as being inclined to mate with a corresponding inclined edge of the rectangular insert 29. However, inserts of other than the bevel type are available and can be employed. Similarly, it may be desirable to incline the seat 28 to provide a negative, rather than a positive rake angle A, and the invention contemplates changes in these respects, which are not of controlling importance other than in regard to the fact that the selection of the angle at seat 28 may call for a corresponding selection of the insert receiving groove or slot (to be described) of the centering drill 14.

A conventional chipbreaker 30 rests upon the insert 29, these parts being clamped rigidly in place by a clamp member 31, through which a clamp screw 32 extends into threaded engagement with the tool holder head 11. Such clamping provisions are more or less conventional.

Now specially considering FIGS. 3 and 4 in conjunction with FIGS. 1 and 2, the centering drill 14 is provided, in addition to its fluting and cutting edge means 16, 17 described above, with diametrically opposed guide slots, generally designated 34, extending lengthwise and rearwardly from its tapered nose portion 35 in an axial direction a distance approximating one-half the axial length of the drill. Each slot 34 is defined by a radially inner side wall 36 of uniform depth located about midway of the radius of the drill and an axially extending bottom wall 37 in a plane approximately coinciding with the axis of the drill and intersected at about 90° by the side wall 36. However, as illustrated in FIG. 4, in the event a rake angle is desired for the mount of the facing insert 29, the wall 37 will be correspondingly angled somewhat relative to the drill axis, shown at A in FIG. 4 as a positive rake of about 5°.

This is for the purpose of avoiding binding in the axial adjustment of the drill 14, as described above; for the slot radially receives the inner edge of the facing insert 29, as clearly shown in FIGS. 1 and 2, with said inner edge spaced radially outwardly of the bottom wall 37 of the slot, and moves relative to the insert in its axial adjustment. The axial length of the drill guide slot 34 is sufficient to permit any desired length of axial adjustment of drill 14 relative to the facing cutter inserts 29 which is required to bring the cutting nose 35 of the drill into a desired position of intersection, in the axial direction, with the cutting plane of inserts 29, which is at 90° to the axis of the tool 10. As indicated above, the tapering of the drill slot surface 37, if present to afford a desired rake, prevents binding during this limited adjustment of the drill 14 in one direction or the other. The insert 29 and chipbreaker 30 are rigidly clamped in place without exerting radial pressure on the drill such as would prevent adjustment thereof upon manipulation of the thread plug 19. The drill is held locked in the adjusted position solely by means of the set screw 22.

It is thus seen that the invention affords a combined facing and center boring tool wherein, by an axial adjustment of the drill 14, the diameter of an end center formation made by the latter may be readily and quickly altered as desired. In any intended position of adjustment, the facing cut directly intersects the center bore.

FIG. 7 of the drawings indicates the manner in which the tool may be optionally modified slightly for the reception of conventional facing cutter inserts 40 of triangular outline. In this instance, all that is necessary to do is to provide recesses in the tool head which are of acutely angled, outwardly divergent wall outline at 41 for mating engagement with the insert 40 and a correspondingly shaped chipbreaker 42. The inner apex of the insert extends into the slot of drill 14 in the manner described above, though necessarily with a lesser length of overlap. Hence, the drill slots, designated 43, may be of shorter axial length than in the first embodiment. In other respects, the embodiments of FIG. 7 is identical to that of FIGS. 1 through 6, hence corresponding reference numerals are employed to designate corresponding parts.

While in the foregoing description reference has been made to facing cutters 29 and 40 which will in operation follow a generated cutting plane in a 90° transverse relation to the axis of drill 14, since the forward cutting edges of these tools are in that relation, it will be recognized that these edges may be at an acute angle to the axis to generate a conical facing cut, or the cutting edges may be of a special contour of one sort or another. However, the invention is deemed to be followed so long as the annunlar generated surface is axially adjustably overlapped at its inner periphery by the conical cut of drill 14; and therefore any following references to the cutting plane of the facing cutter inserts is to be broadly construed in this light.

Similarly, though the centering cutter has been described as a drill having the forward conical cutting portion 35, it is to be understood that the invention is not necessarily limited in this respect, but embraces related types of center cutters, so long as there exists the adjustably radially overlapped relation thereof to the facing cutter radially outwardly thereof.

What I claim as my invention is:

1. A combined centering and facing tool, comprising a rotatable tool holder having an axially forwardly exposed recess providing a cutter receiving seat, a facing cutter, means to rigidly but releasably clamp said facing cutter on said seat to present a cutting edge of said cutter to follow a cutting plane forwardly and approximately diametral of the holder, said holder being provided with an axial bore opening forwardly thereof and radially inwardly intersected by said seat recess, an edge portion of the cutter on said seat extending radially inwardly of said bore, a drill received in said bore for axial adjustment therein, said drill having an axially extending slot receiving said cutter edge portion, which slot is at least in part defined by a radial side wall generally paralleling the axis of the drill and a bottom wall substantially normal to said side wall, said facing cutter radially inwardly overlapping said radial side wall and being radially spaced outwardly of said bottom wall, said drill having a generally conical forward cutting portion radially outwardly intersecting at an acute angle said forward cutting edge of said cutter and adapted to form a recess correspondingly intersecting said cutting plane radially, and means for axially adjusting said drill in said bore to vary the point of intersection of said drill cutting portion and said cutting edge.

2. A combined centering and facing tool, comprising a rotatable tool holder having an axially forwardly exposed recess providing a cutter receiving seat, a facing cutter, means to rigidly but releasably clamp said facing cutter on said seat to present a cutting edge of said cutter to follow a cutting plane forwardly and approximately diametral of the holder, said holder being provided with an axial bore opening forwardly thereof and radially inwardly intersected by said seat recess, an edge portion of the cutter on said seat extending radially inwardly of said bore, a drill received in said bore for axial adjustment therein, said drill having an axially extending slot receiving said cutter edge portion, which slot is at least in part defined by a radial side wall generally paralleling the axis of the drill and a bottom wall substantially normal to said side wall, said facing cutter radially inwardly overlapping said radial side wall and being radially spaced outwardly of said bottom wall, said drill having a generally conical forward cutting portion radially outwardly intersecting at an acute angle said forward cutting edge of said cutter and adapted to form a recess correspondingly intersecting said cutting plane radially, and means for axially adjusting said drill in sad bore to vary the point of intersection of said drill cutting portion and said cutting edge, said bottom wall of said slot being at an inclination to the axis of said drill.

References Cited by the Examiner

UNITED STATES PATENTS

| | | | |
|---|---|---|---|
| 298,248 | 5/1884 | Smart | 77—66 |
| 745,048 | 11/1903 | Fuhrer | 77—66 |
| 2,294,969 | 9/1952 | Engvall | 77—65 |
| 2,661,642 | 12/1953 | Marcucci | 77—66 |
| 2,673,479 | 3/1954 | Gruett | 77—66 |
| 2,891,429 | 6/1959 | Tragge | 77—65 |
| 2,899,851 | 8/1959 | Grobecker | 77—66 |
| 3,027,786 | 4/1962 | Severson | 77—58 |

WILLIAM W. DYER, Jr., *Primary Examiner.*